United States Patent
Krishna et al.

(10) Patent No.: US 10,026,322 B2
(45) Date of Patent: Jul. 17, 2018

(54) INTEGRATED CONTROLLER-PILOT DATALINK COMMUNICATION SYSTEMS AND METHODS FOR OPERATING THE SAME

(71) Applicant: HONEYWELL INTERNATIONAL INC., Morristown, NJ (US)

(72) Inventors: Kiran Gopala Krishna, Karnataka (IN); Vinoda Ramaiah, Karnataka (IN); Dave Pepitone, Sun City West, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 74 days.

(21) Appl. No.: 14/557,979

(22) Filed: Dec. 2, 2014

(65) Prior Publication Data
US 2016/0155337 A1 Jun. 2, 2016

(51) Int. Cl.
G08G 5/00 (2006.01)
H04B 7/185 (2006.01)
G02B 27/01 (2006.01)

(52) U.S. Cl.
CPC ....... G08G 5/0013 (2013.01); G02B 27/0101 (2013.01); G08G 5/0021 (2013.01); H04B 7/18506 (2013.01); G02B 2027/0141 (2013.01)

(58) Field of Classification Search
CPC ............ G08G 5/0013–5/0021; H04B 7/18506
See application file for complete search history.

(56) References Cited

U.S. PATENT DOCUMENTS

| 8,626,358 | B2 | 1/2014 | McGuffin et al. |
| 2008/0163093 | A1* | 7/2008 | Lorido ............... G01C 23/00 715/771 |
| 2011/0137998 | A1* | 6/2011 | Judd ............... G08G 5/0013 709/206 |
| 2012/0066617 | A1 | 3/2012 | Gupta et al. |
| 2012/0078447 | A1* | 3/2012 | McGuffin ............ G08G 5/0021 701/3 |
| 2012/0078494 | A1* | 3/2012 | Judd ............... G08G 5/0021 701/120 |

FOREIGN PATENT DOCUMENTS

| CN | 100364269 C | 1/2008 |
| EP | 2330583 A2 | 6/2011 |
| EP | 2383714 A1 | 11/2011 |

OTHER PUBLICATIONS

Matyas, M.; Expanding Future Air Navigation System (FANS) Utilization; ICAO EUR Region PBN Workshop Aug. 2013.
(Continued)

Primary Examiner — Carolyn R Edwards
(74) Attorney, Agent, or Firm — Lorenz & Kopf, LLP (57) ABSTRACT

Integrated controller-pilot datalink communication (CPDLC) systems and methods for operating the same are disclosed. In one implementation, an integrated CPDLC system includes a plurality of CPDLC-enabled avionics devices and a CPDLC context manager coupled with each of the plurality of CPDLC-enabled avionics devices. The CPDLC system further includes a shared CPDLC context memory coupled with the CPDLC context manager and a CPDLC message in/out buffer coupled with the CPDLC context manager.

9 Claims, 7 Drawing Sheets

(56) References Cited

OTHER PUBLICATIONS

Honeywell; CPDLC Procedures; Contract: DTFAWA-10-A-80031, Task: 09-AJP61FG1-121, Milestone: Final Report; Recommendations for General System Performance Requirements, Design of Standard Operating Procedures and Operating Limitations for CPDLC; Final Report, Document No. DTFAWA-10-A-80031-MYY-01-ZZ, Revision No. Rev2; Sep. 2, 2011.
EP Search Report for Application No. 15196394.9 dated May 19, 2015.

* cited by examiner

FIG. 5

INTEGRATED CONTROLLER-PILOT DATALINK COMMUNICATION SYSTEMS AND METHODS FOR OPERATING THE SAME

TECHNICAL FIELD

Embodiments of the subject matter described herein relate generally to aircraft display systems and methods of operating aircraft display systems. More particularly, embodiments of the subject matter described herein relate to integrated controller-pilot datalink communication systems and methods for operating the same.

BACKGROUND

The standard method of communication between an air traffic controller and a pilot of an aircraft is voice radio, using either VHF bands for line-of-sight communication or HF bands for long-distance communication. One of the major problems with voice radio communications used in this manner is that all pilots being handled by a particular controller are tuned to the same frequency. As the number of flights air traffic controllers must handle is steadily increasing, the number of pilots tuned to a particular station also increases. This increases the chances that one pilot will accidentally override another, thus requiring the transmission to be repeated. In addition, each exchange between a controller and pilot requires a certain amount of time to complete; eventually, as the number of flights being controlled reaches a saturation point, the controller will not be able to handle any further aircraft. Thus, a new strategy is needed to cope with increased demands on air traffic control, and data link based communications offers a possible strategy by increasing the effective capacity of the communications channel.

Controller-pilot data link communication (CPDLC) is a means of communication between controller and pilot, using data link for air traffic control (ATC) communication. The CPDLC application provides air-ground data communication for the ATC service. This includes a set of clearance/information/request message elements that correspond to voice phraseology employed by air traffic control procedures. The controller is provided with the capability to issue flight level assignments, crossing constraints, lateral deviations, route changes and clearances, speed assignments, radio frequency assignments, and various requests for information. The pilot is provided with the capability to respond to messages, to request clearances and information, to report information, and to declare/rescind an emergency. The pilot is, in addition, provided with the capability to request conditional clearances (downstream) and information from a downstream air traffic service unit (ATSU). A "free text" capability is also provided to exchange information not conforming to defined formats. An auxiliary capability is provided to allow a ground system to use data link to forward a CPDLC message to another ground system.

With CPDLC, there is increased communication between ATC and the pilot via text, and thus reduced communication over VHF or HF. As more applications are developed for CPDLC, the CPDLC operations can be performed from various applications or devices connected to the onboard avionics. For example, current CPDLC operations can be performed from the multifunction control display unit (MCDU), forward looking displays, and the guidance panel, among others as are known in the art. With existing avionics architectures and setups, the entire CPDLC operation has to be performed on one of the aforesaid avionics devices/applications. That is, the pilot does not have a choice to choose the best modality in constructing or acknowledging a CPDLC message. Each modality (knob turn/button press/cursor move and click/touch) have their own advantages and disadvantages. As such, current CPDLC-enabled avionics systems are not "integrated" in the sense that they are not able to cooperate with one another to allow the pilot to select the best system(s) to construct or respond to a CPDLC message.

Accordingly, it would be desirable to provide systems and methods that enable an aircraft pilot greater freedom of choice in constructing or responding to CPDLC messages using one or more CPDLC-enabled avionics systems most suitable for a given CPDLC context. Moreover, it would be desirable to provide systems and methods that reduce pilot workload and response time in constructing or responding to CPDLC messages. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

Integrated controller-pilot datalink communication (CPDLC) systems and methods for operating the same are disclosed. In one exemplary embodiment, an integrated CPDLC system includes a plurality of CPDLC-enabled avionics devices and a CPDLC context manager coupled with each of the plurality of CPDLC-enabled avionics devices. The CPDLC system further includes a shared CPDLC context memory coupled with the CPDLC context manager and a CPDLC message in/out buffer coupled with the CPDLC context manager.

In another exemplary embodiment, a method for operating an integrated CPDLC system includes the steps of activating a CPDLC mode in each of a plurality of CPDLC-enabled avionics devices and constructing a CPDLC message using one or more of the CPDLC-enabled avionics devices. The method further includes communicating the CPDLC message to a CPDLC communications unit using a CPDLC context manager.

In yet another exemplary embodiment, a method for operating an integrated CPDLC system includes the steps of receiving a CPDLC message at a CPDLC communications unit and activating a CPDLC mode in one or more of a plurality of CPDLC-enabled avionics devices using a CPDLC context manager. The method further includes displaying the CPDLC message on each of the one or more of the plurality of CPDLC-enabled avionics devices.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary, or the following Detailed Description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
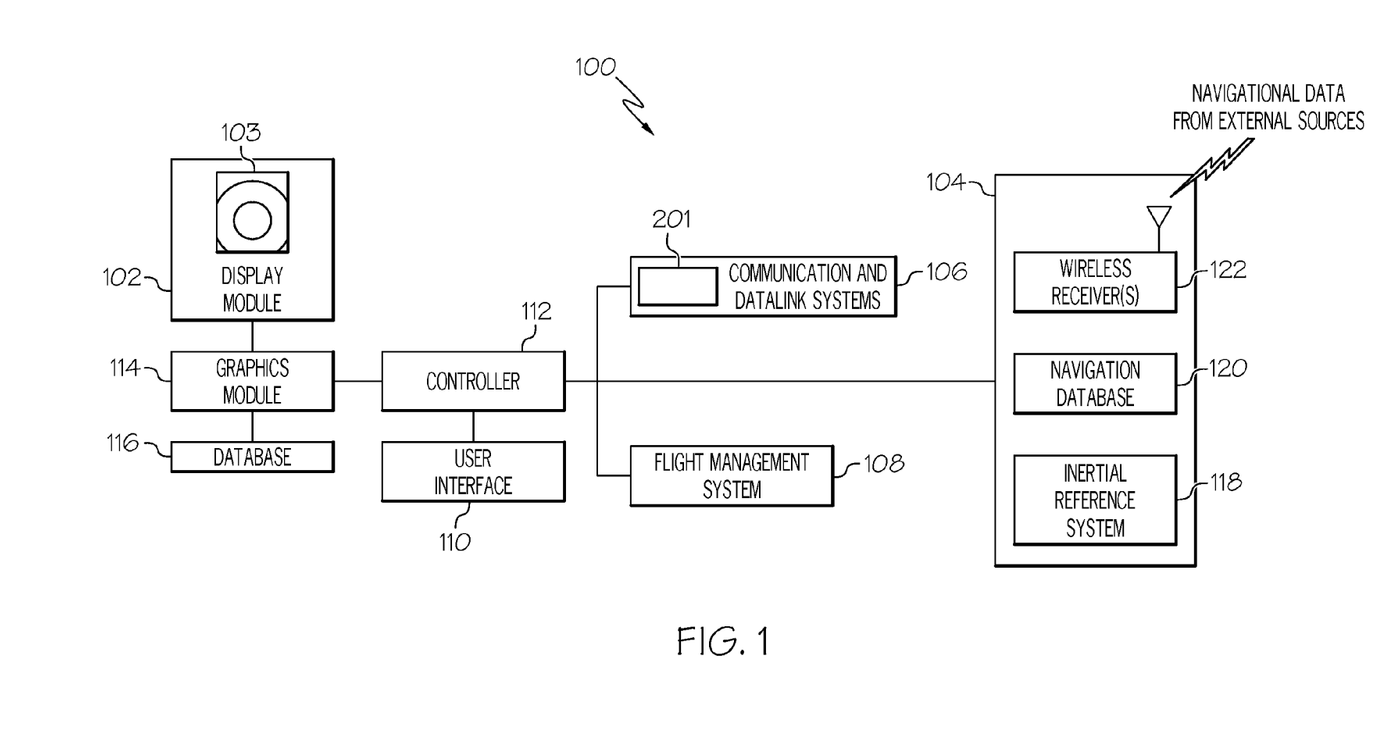
FIG. 1 depicts an exemplary embodiment of an aircraft display system in accordance with embodiments of the present disclosure.

FIG. 1 depicts an exemplary embodiment of an aircraft display system 100. In an exemplary embodiment, the display system 100 includes, without limitation, a display device/module 102 for displaying a graphical flight plan image 103, a navigation system 104, a communications and datalink system 106, a flight management system (FMS) 108, a controller 112, a graphics module 114, a user interface 110, and a database 116 suitably configured to support operation of the graphics module 114 and display device 102, as described in greater detail below. Navigation system 104 may include an inertial reference system 118, a navigation database 120, and one or more wireless receivers 122 for receiving navigational data from external sources in a well-known manner.

It should be understood that FIG. 1 is a simplified representation of a display system 100 for purposes of explanation and ease of description and is not intended to limit the application or scope of the subject matter in any way. In practice, the display system 100 and/or the aircraft will include numerous other devices and components for providing additional functions and features, as will be appreciated in the art. For example, the display system 100 and/or the aircraft may include one or more avionics systems (e.g., a weather system, an air traffic management system, a radar system, a traffic avoidance system) coupled to the flight management system 108 and/or the controller 112 for obtaining and/or providing real-time flight-related information that may be displayed on the display device 102.

In an exemplary embodiment, the display device 102 is coupled to the graphics module 114. The graphics module 114 is coupled to the processing controller 112, and the processing controller 112 and the graphics module 114 are cooperatively configured to display, render, or otherwise convey graphical representations or images on the display device 102. As stated previously, navigational system 104 includes an inertial reference system 118, a navigation database 120, and at least one wireless receiver 122. Inertial reference system 118 and wireless receiver 122 provide controller 112 with navigational information derived from sources onboard and external to the host aircraft, respectively. More specifically, inertial reference system 118 provides controller 112 with information describing various flight parameters of the host aircraft (e.g., position, orientation, velocity, etc.) as monitored by a number of motion sensors (e.g., accelerometers, gyroscopes, etc.) deployed onboard the aircraft. By comparison, and as indicated in FIG. 1, wireless receiver 122 receives navigational information from various sources external to the aircraft. These sources may include various types of navigational aids (e.g., global position systems, non-directional radio beacons, very high frequency omni-directional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 122 may also periodically receive Automatic Dependent Surveillance-Broadcast (ADS-B) data from neighboring aircraft. In a specific implementation, wireless receiver 122 assumes the form of a multi-mode receiver (MMR) having global navigational satellite system capabilities.

Navigation database 120 includes various types of navigation-related data stored therein. In a preferred embodiment, navigation database 120 is an onboard database that is carried by the aircraft. The navigation-related data includes various flight plan related data such as, for example, and without limitation: locational data for geographical waypoints; distances between waypoints; track between waypoints; data related to different airports; navigational aids; obstructions; special use airspace; political boundaries; communication frequencies; and aircraft approach information.

Controller 112 is coupled to the navigation system 104 for obtaining real-time navigational data and/or information regarding operation of the aircraft to support operation of the display system 100. In an exemplary embodiment, the communications and datalink system 106 is coupled to the controller 112 and configured to support communications to and/or from the aircraft, as is appreciated in the art. The controller 112 is also coupled to the flight management system 108, which in turn, may also be coupled to the navigation system 104 and the communications and datalink system 106 for providing real-time data and/or information regarding operation of the aircraft to the controller 112 to support operation of the aircraft. In an exemplary embodiment, the user interface 110 is coupled to the controller 112, and the user interface 110 and the controller 112 are cooperatively configured to allow a user to interact with display device 102 and other elements of display system 100, as described in greater detail below.

In an exemplary embodiment, the display device 102 is realized as an electronic display configured to graphically display flight information or other data associated with operation of the aircraft under control of the graphics module 114. In an exemplary embodiment, the display device 102 is located within a cockpit of the aircraft. It will be appreciated that although FIG. 1 shows a single display device 102, in practice, additional display devices may be present onboard the aircraft. In an exemplary embodiment, the user interface 110 is also located within the cockpit of the aircraft and adapted to allow a user (e.g., pilot, co-pilot, or crew member) to interact with the remainder of display system 100 and enables a user to select content displayed on the display device 102, as described in greater detail below. In various embodiments, the user interface 110 may be realized as a keypad, touchpad, keyboard, mouse, touchscreen, joystick, knob, microphone, or another suitable device adapted to receive input from a user. In preferred embodiments, user interface 110 may be a touchscreen, cursor control device, joystick, or the like.

In an exemplary embodiment, the navigation system 104 is configured to obtain one or more navigational parameters associated with operation of the aircraft. The navigation system 104 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. The navigation system 104 may also obtain and/or determine the heading of the aircraft (i.e., the direction the aircraft is traveling in relative to some reference).

In an exemplary embodiment, the communications and datalink system 106 is suitably configured to support communications between the aircraft and another aircraft or ground location (e.g., air traffic control) either via voice commands or data messaging. In this regard, the communications and datalink system 106 may be realized using a radio communication system or another suitable data link system. In an exemplary embodiment, the communications and datalink system 106 includes a CPDLC communications unit 201, as will be described in greater detail below. The flight management system 108 (or, alternatively, a flight management computer) is located onboard the aircraft. Although FIG. 1 is a simplified representation of display system 100, in practice, the flight management system 108 may be coupled to one or more additional modules or components as necessary to support navigation, flight planning, and other aircraft control functions in a conventional manner.

The controller 112 and/or graphics module 114 are configured in an exemplary embodiment to display and/or render information on the display device 102 to allow a user (e.g., via user interface 110) to review various aspects (e.g., estimated flight time, rates of ascent/descent, flight levels and/or altitudes, and the like) of the flight plan. The controller 112 generally represents the hardware, software, and/or firmware components configured to facilitate the display and/or rendering of a navigational map on the display device 102 and perform additional tasks and/or functions described in greater detail below. Depending on the embodiment, the controller 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The controller 112 may also be implemented as a combination of computing devices, e.g., a combination of a digital signal processor and a microprocessor, a plurality of microprocessors, one or more microprocessors in conjunction with a digital signal processor core, or any other such configuration. In practice, the controller 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the controller 112, or in any practical combination thereof.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a terrain database, a weather database, a flight plan database, an obstacle database, a navigational database, a geopolitical database, a terminal airspace database, a special use airspace database, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Figure 2:
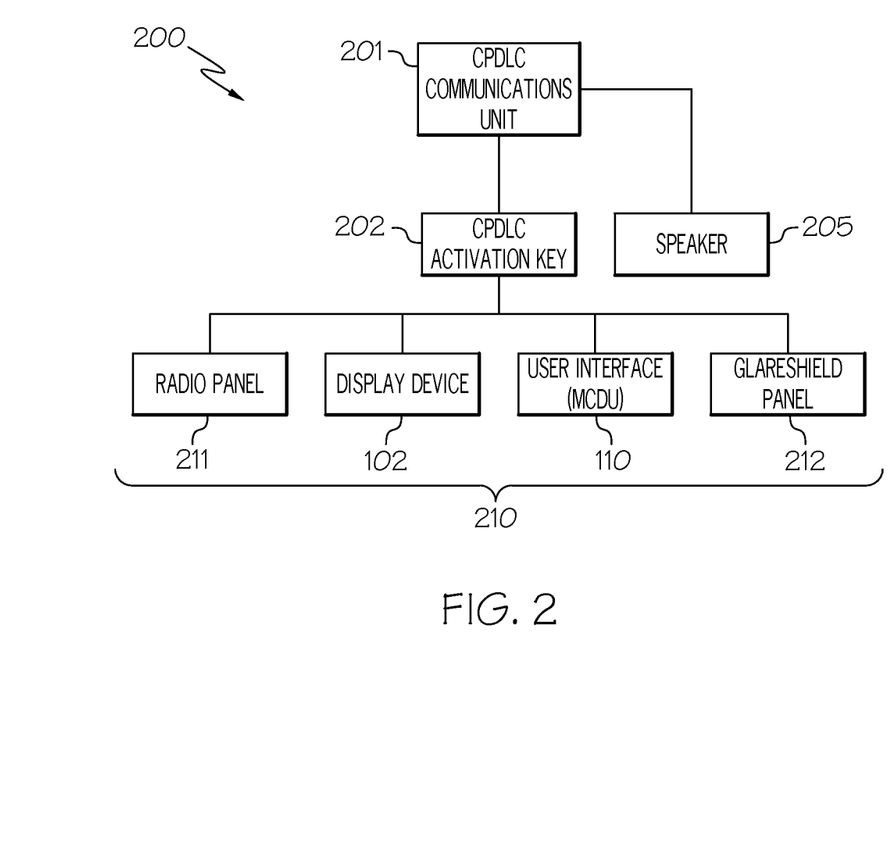
FIG. 2 depicts an integrated, context-aware CPDLC system in accordance with embodiments of the presented disclosure.

The aircraft display system described above may further include an integrated, context-aware CPDLC system 200 as shown and described with respect to FIG. 2. The CPDLC system 200 includes CPDLC communications unit 201. In one embodiment, the CPDLC communication unit 201 is installed on the same on-board aircraft system where the aircraft's CPDLC applications are installed. For example, in some embodiments, the physical device performing the CPDLC message processing will be the aircraft's communications and datalink system 106, or other system executing the CPDLC application. In some embodiments, therefore, functions relating to CPDLC message processing discussed herein are implemented at least in part as a software application executing on such physical devices.

The CPDLC communications unit 201 is coupled to a speaker 205 and to a CPDLC activation key 202, which in some embodiments may be referred to as a CPDLC "hot key." Pressing the CPDLC activation key 202 activates all subscribed avionics systems to switch to an integrated CPDLC mode. As shown in FIG. 2, the CPDLC activation key is coupled to a plurality of CPDLC-subscribed user interface devices 210. In non-limiting examples, these CPDLC-subscribed user interface devices 210 may include, but are not limited to, a cockpit radio panel 211, the display device/module 102, the user interface 110 (which in some embodiments may take the form of, or may include, an MCDU), and a glareshield panel 212. In the prior art, each of the devices 210 described above was capable of individually functioning in a CPDLC mode. However, none of the devices 210 were capable of cooperating with one another in an integrated CPDLC context. In accordance with the present disclosure, the CPDLC activation key 202 is provided to initiate all of the devices 210 to switch their modes to the integrated, context-aware CPDLC mode of operation. For example, when the CPDLC activation key 202 is pressed by the pilot, each of the CPDLC-subscribed user interface devices 210 (e.g., the radio panel 211, the display device 102, the MCDU 110, and the glareshield panel 212) automatically switches to the CPDLC mode of operation.

Figure 3A:
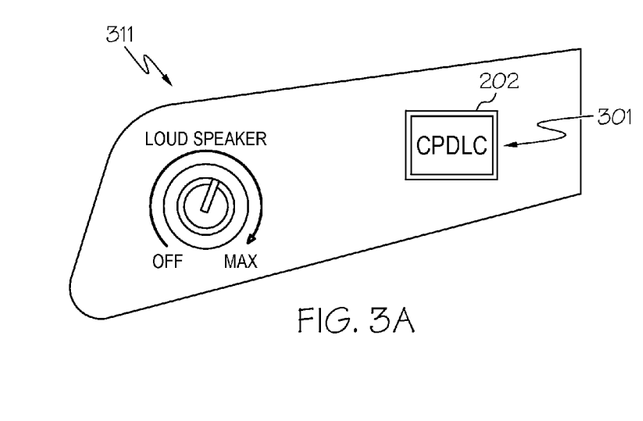
FIGS. 3A-3D depict various subscribed avionics devices/applications in an integrated, context-aware CPDLC mode of operation in accordance with embodiments of the present disclosure.
Figure 3B:
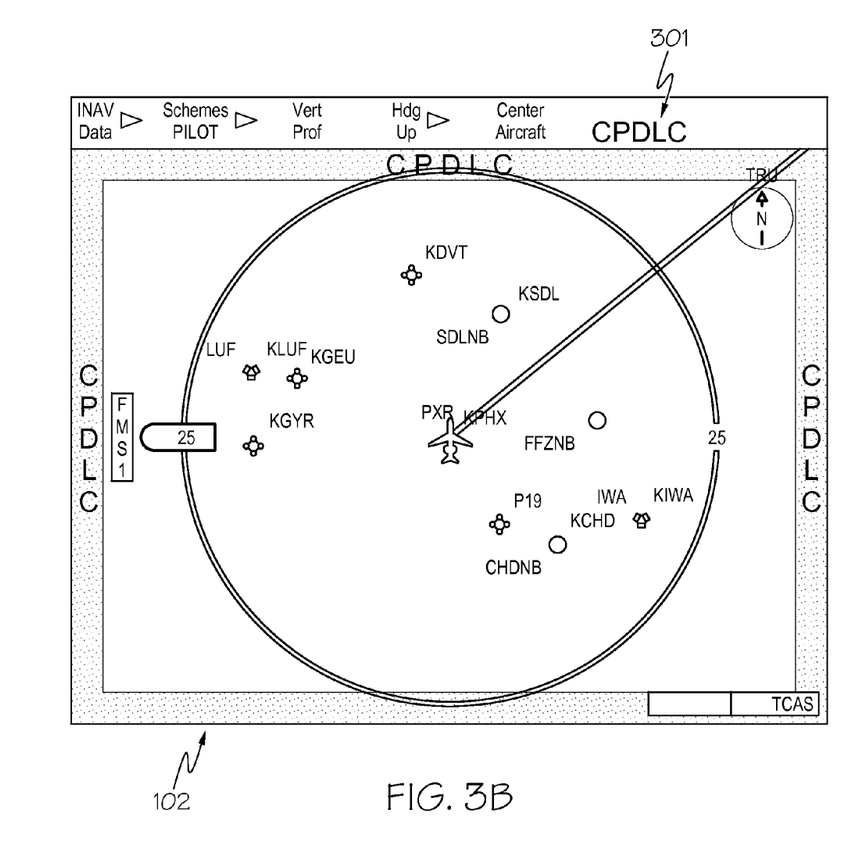
Figure 3C:
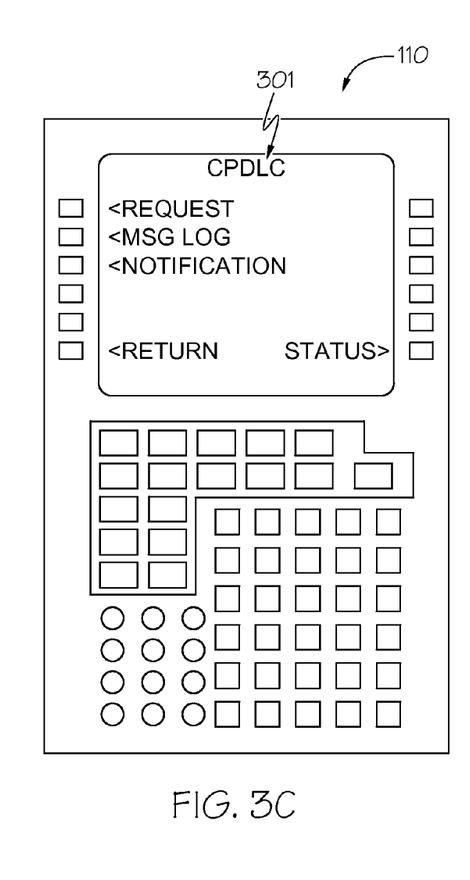
Figure 3D:
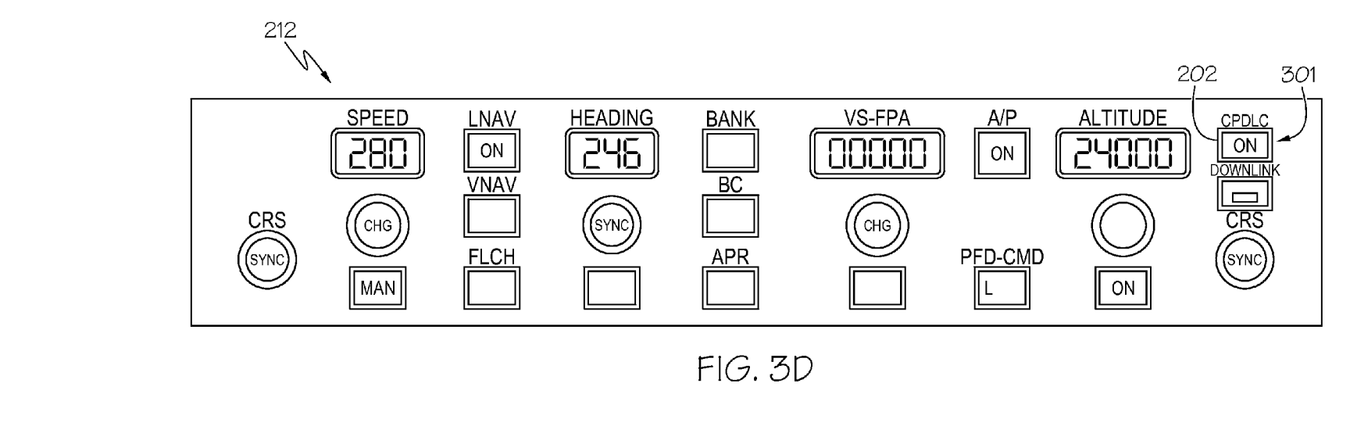

The implementation and use of the CPDLC activation key 202 creates a continuity of operation for a common objective across the various subscribed avionics devices/applications 210. FIGS. 3A-3D illustrate such devices 210 after the CPDLC activation key 202 has been pressed by the pilot. FIGS. 3A and 3D further illustrate various implementations of the CPDLC activation key 202. For example, in FIG. 3A, a portion of an exemplary dedicated panel 311 is illustrated. The dedicated panel 311 is an example of a location where the CPDLC activation key 202 may be implemented, as shown. The dedicated panel 311 includes an indication 301 of when the integrated, context-aware CPDLC mode has been activated, for example by pressing the CPDLC activation key 202 thereon. In this example, the indication 301 is the illumination of the letters "CPDLC" on the activation key 202, as shown. In a further example, in FIG. 3B, the display device 102 includes the indication 301 in the form of the letters "CPDLC" being superimposed over the display, for example on one of more of a top portion or side portion of the display, as shown. In a further example, in FIG. 3C, the MCDU 110 includes the indication 301 located above the text portions of the MCDU display in the form of the letters "CPDLC" being printed thereon. It will also be appreciated that, although not illustrated, the CPDLC mode may be activated through the MDCU 110 by browsing to the CPDLC page and selecting a CPDLC activation button (e.g., similar in function to key 202). In yet a further example, in FIG. 3D, a portion of an exemplary glareshield panel 212 is illustrated. The glareshield panel 212 is an example of a location where the CPDLC activation key 202 may be implemented, as shown. The glareshield panel 212 includes the indication 301, which again may include the illumination of the letters "CPDLC" upon pressing of the CPDLC activation key 202. In any of the embodiments described above, pressing the CPDLC activation key 202 activates all subscribed avionics systems 210 to switch to the CPDLC mode. In this regard, for example, the MCDU 110 shows the CPDLC page ready to take pilot input and/or show ATC communications, the display device 102 goes into CPDLC mode (or activates CPDLC pages thereon), and the glareshield panel 212 switches to CPDLC mode as well.

Figure 4:
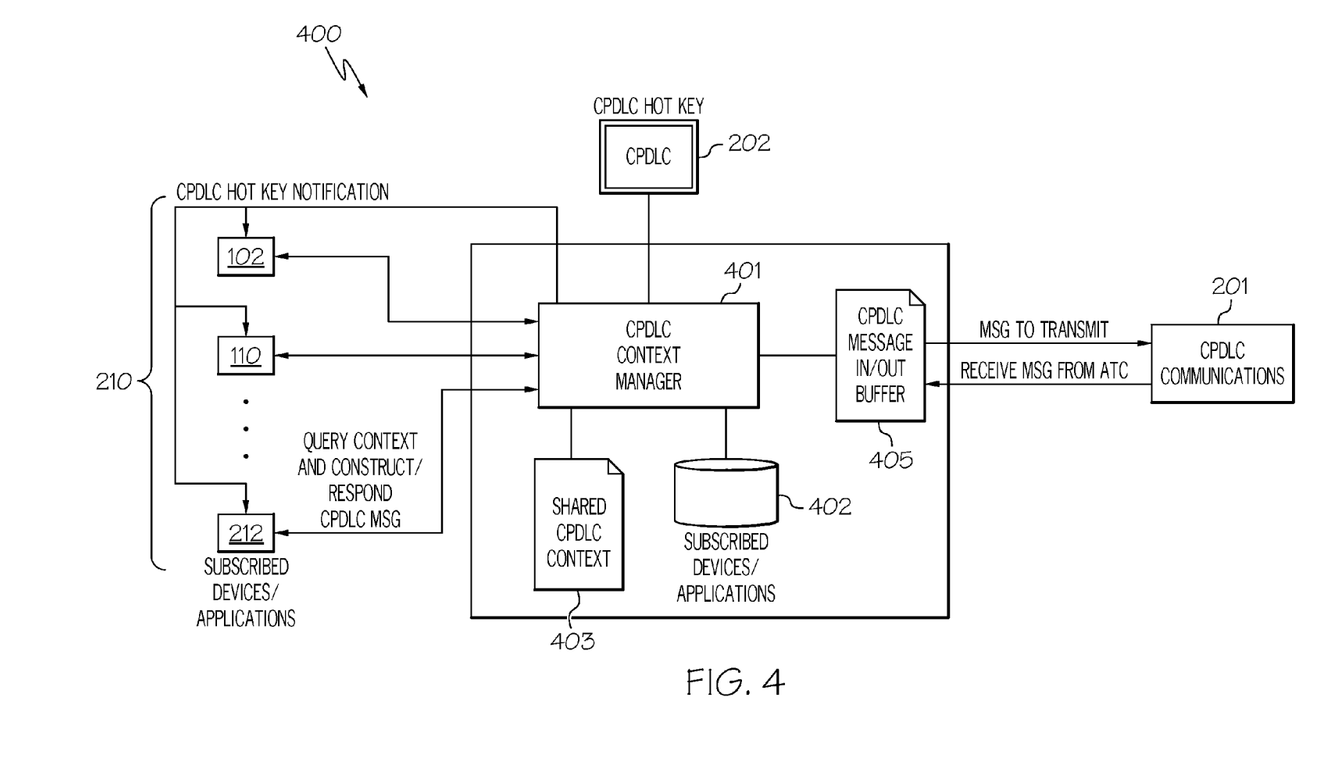
FIG. 4 provides an exemplary CPDLC context notification and messaging architecture in accordance with embodiments of the present disclosure.

With reference now to FIG. 4, which provides an exemplary CPDLC context notification and messaging architecture 400, when the CPDLC activation key 202 is pressed, the event is registered in a CPDLC context manager 401. The CPDLC context manager 401 sends out the notification to the devices/applications 210 that are subscribed to the CPDLC by looking up a subscribed devices database or lookup table 402 in non-volatile memory. These subscribed devices 210 now switch to the CPDLC mode of operation. All of the subscribed devices 210 are now able to create or respond to a CPDLC message. This is possible because the CPDLC context manager 401 grants access to the subscribers 210 to read/write data into a shared CPDLC context memory 403. Based on the context and usability needs, each device/application assists in partial or complete construction/response to the CPDLC message.

For example, the notification and messaging architecture 400 may be employed to respond to an ATC message in the following manner. Once the complete message is available in the shared CPDLC context memory 403, the CPDLC context manager 401 copies the message to CPDLC message in/out buffer 405, which is then transmitted to the CPDLC communications unit 201 for further processing. In another example, the notification and messaging architecture 400 may be employed to receive an ATC message in the following manner. When the communications unit 201 receives a new CPDLC message from ATC, it transmits the newly-received CPDLC message to the CPDLC message in/out buffer 405 and notifies the CPDLC context manager 401. The CPDLC context manager 401 notifies all the subscribers 210 via the CPDLC messaging architecture 400. Each of the subscribers 400 decodes the received CPDLC message and switches to the CPDLC mode of operation. If a specific CPDLC message is not applicable to a subscriber, the subscriber ignores the message. For example, if the CPDLC message is: "CLIMB TO FL200 AND MAINTAIN ALTITUDE," the display device 102, MCDU 110, and glareshield 212 may switch to CPDLC mode of operation while the radio panel 211 may not do so. Alternately, the context manager 401 may parse the received CPDLC message and notify relevant/applicable subscribers individually, which will then switch to the CPDLC mode.

Accordingly, once in the CPDLC mode, any of the subscribed devices 210 may be used for CPDLC communications. For example, in operation, CPDLC communications unit 201 receives a CPDLC uplink including one or more individual message elements. For each message element, the CPDLC communications unit 201 along with CPDLC context manager 401 extracts a message element ID and generates a series of displays or other outputs for displaying their corresponding messages and prompting a valid response via subscribed avionics devices 210. Optionally, extracted message elements ID(s) can be used to populate a table that includes information and attributes such as, but not limited to the priority, alert level and response type for each element, these attributes may activate features and functions in subscribed avionics devices 210.

In one embodiment, CPDLC context manager 401 may operate to display messages to the pilot, and prompts for valid responses, using any of the subscribed avionics devices 210. For example, using the example shown in FIG. 3B of the display device 102 being subscribed, the display device 102 enters CPDLC mode and the pilot may enter a request or respond to a request. When a flight crew member decides to initiate/respond to a CPDLC uplink, CPDLC context manager 401 utilizes extracted elements IDs to bring up specific display screens onto display device 102. Those specific display screens are presented to the flight crew user, one at a time, via display device 102.

Figure 5:
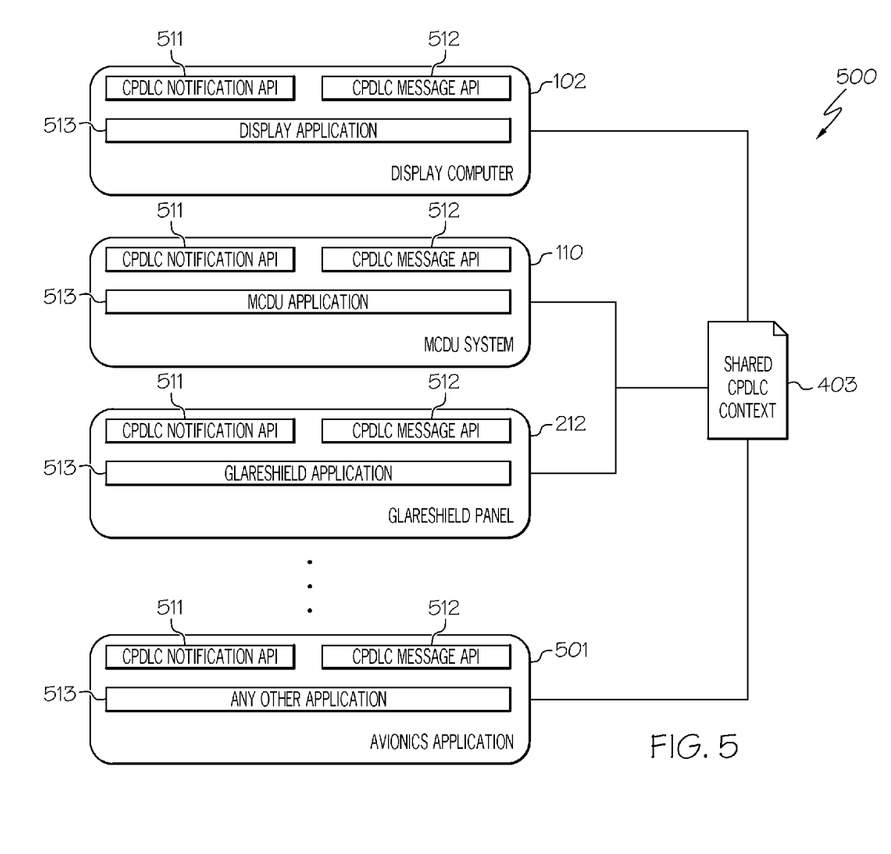
FIG. 5 provides a general processing architecture for performing various CPDLC operations in accordance with embodiments of the present disclosure.

FIG. 5 provides a general processing architecture for a subscriber CPDLC device/application to read/write onto the shared CPDLC context memory 403, receive the CPDLC activation key 202 notification, and receive/respond to messages from CPDLC context manager 401. As shown, each of the subscribed devices 210 (e.g., display device 102, MCDU 110, and other avionics application 501) includes both a CPDLC notification application programming interface (API) 511 and a CPDLC message API 512, collectively coupled with the shared CPDLC context memory 403. The API 511 is provided for receiving the CPDLC activation key 202 notification, and the API 512 is provided for receiving/responding to messages from the CPDLC context manager 401. Each application 513 of the subscribed devices 210 may accordingly read/write to the CPDLC context memory 403.

Figure 6A:
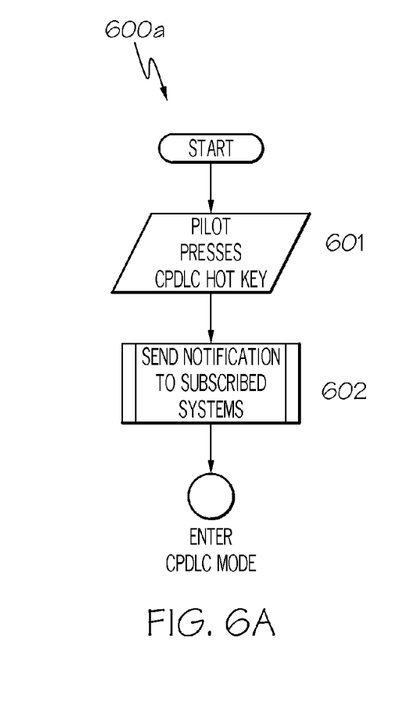
FIGS. 6A-6C provide methods for operating the integrated, context-aware CPDLC system in accordance with embodiments of the present disclosure.
Figure 6B:
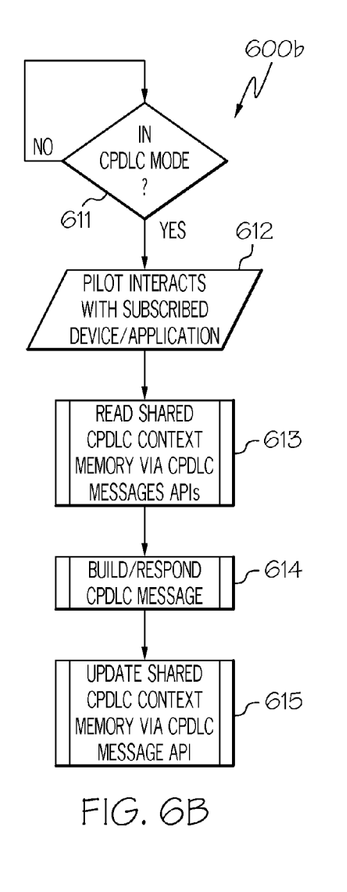
Figure 6C:
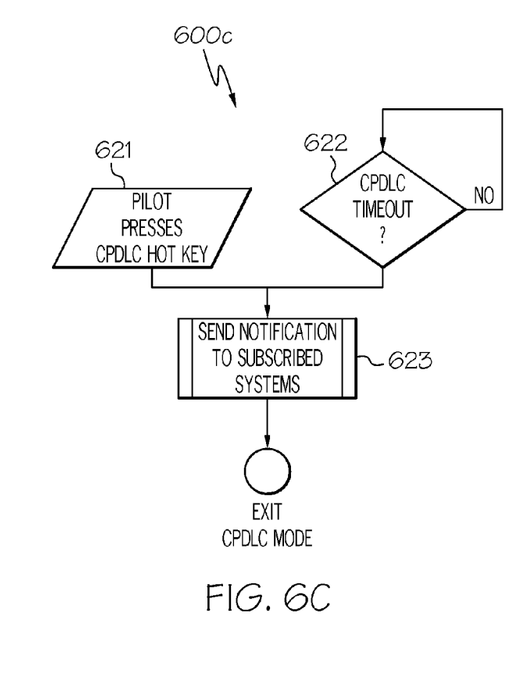

FIGS. 6A-6C provide methods for operating the integrated, context-aware CPDLC system in accordance with embodiments of the present disclosure. More particularly, FIGS. 6A-6C show the process flow from the time of entry into CPDLC mode to the time of exit from CPDLC mode. With reference first to FIG. 6A, which illustrates an exemplary CPDLC mode entry process 600a, once the crew presses the CPDLC activation key 202 (step 601), a notification is sent to the CPDLC subscribed devices 210 by the CPDLC context manager 401 (step 602). With reference next to FIG. 6B, which illustrates an exemplary CPDLC mode messaging process 600b, once the device switches to CPDLC mode of operation (determination made at step 611), the crew can make a CPDLC request or respond to an ATC communication (step 612). Based on the operation performed on one of the devices/applications 210 (for example dialing of altitude FL200 on the glareshield panel 212), the display device 102 and the MCDU 110 is notified of the dialed altitude from the shared CPDLC context memory 403 via the CPDLC messaging API 512 (step 613). The "Request Altitude FL200" is displayed on the scratch pad on the MCDU 110 and the display area on the display device 102. The crew is now able to review/edit the message either on MCDU 110 or display device 102 (step 614), and hit a line select key on MCDU 110 or click a button on another device to downlink the CPDLC message to the ATC (step 615). With reference now to FIG. 6C, which illustrates an exemplary CPDLC mode exit process 600c, once the process 600b is performed, the pilot can select the CPDLC activation key 202 (step 621), to exit the CPDLC mode. Alternately, with a predetermined time threshold, the CPDLC mode is automatically exited out (step 622). Thereafter, the CPDLC context manager sends a notification to the subscribed avionics systems 210 to exit CPDLC mode (step 623). When the CPDLC mode disengages or times-out, the previous guidance panel or display settings are then re-established. In the illustrative example of the MCDU 110, once the CPDLC mode is disengaged, the MCDU 110 should revert to the previous altitude displayed in the altitude window thereof.

Illustrative Examples

The present disclosure is now illustrated by the following non-limiting examples. It should be noted that various changes and modifications can be applied to the following examples and processes without departing from the scope of this invention, which is defined in the appended claims. Therefore, it should be noted that the following examples should be interpreted as illustrative only and not limiting in any sense.

Example 1: Pilot Requests Climb to 50,000 ft. at Waypoint GUP

Step 1: Push CPDLC activation key 202
Step 2: Dial altitude knob on glareshield 212 to 50,000 ft.
Step 3: Select waypoint "GUP" on display device 102 using cursor control device or touch device (note: display device 102 automatically would have switched to CPDLC mode as it is a subscriber)
Step 4: Review the message on display device 102
Step 5: Click "send" button on display device 102
Step 6: Pilot disengages CPDLC mode or CPDLC mode times out Example 2: Pilot Requests Climb to 50,000 ft. at Waypoint GUP Step 1: Push CPDLC activation key 202
Step 2: Select waypoint "GUP" on display device 102 using cursor control device or touch device
Step 3: Dial altitude knob on glareshield 212 to 50,000 ft.
Step 4: Review the message on MCDU 110 scratchpad (note: MCDU 110 would have automatically switched to CPDLC page and shows relevant text as it is a subscriber)
Step 5: Press "send" button line select key on MCDU 110 display
Step 6: Pilot disengages CPDLC mode or CPDLC mode times out
Step 7: MCDU 110 reverts to the previous altitude displayed in the altitude window Example 3: ATC Requires Climb and Maintain 50,000 ft. at Waypoint GUP Step 1: Pilot hears a chime (e.g., from speaker 205) for new message from ATC
Step 2: Push CPDLC activation key 202
Step 3: The display device 102 enters CPLDC mode and shows pending vertical flight plan (climbing to 50000 ft at waypoint "DAISY")
Step 4: Pilot reviews and selects WILCO button on display device 102

Step 5: Pilot disengages CPDLC mode or CPDLC mode times out

Example 4: ATC Requires Climb and Maintain 50,000 ft. at Waypoint GUP

Step 1: Pilot hears a chime (e.g., from speaker 205) for new message from ATC

Step 2: Push CPDLC activation key 202

Step 3: MCDU 110 page switches to CPDLC mode and shows CPDLC message and flight plan edited for 50,000 ft. climb at waypoint "DAISY" (in edit color) and a WILCO/UNABLE option (in edit color)

Step 4: Pilot chooses the line select key next to WILCO on MCDU 110

Step 5: Pilot disengages CPDLC mode or CPDLC mode times out

Step 6: MCDU 110 reverts to the previous altitude displayed in the altitude window Accordingly, described herein have been embodiments that relate to integrated controller-pilot datalink communication systems and methods for operating the same. The described embodiments provide systems and methods that enable an aircraft pilot greater freedom of choice in constructing or responding to CPDLC messages using one or more CPDLC-enabled avionics systems most suitable for a given CPDLC context. Moreover, the described embodiments provide systems and methods that reduce pilot workload and response time in constructing or responding to CPDLC messages.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An integrated controller-pilot datalink communication (CPDLC) system in an aircraft comprising:
    a plurality of CPDLC-enabled avionics devices of the aircraft, wherein said plurality is selected from two or more of the following:
        a) a cockpit forward display device coupled to a graphics module and a graphics database,
        b) a glareshield panel comprising one or more of a speed, heading, or altitude selection button,
        c) a multifunction cockpit display unit (MCDU) comprising a display, a keypad, and a plurality of selection lines, wherein each CPDLC-enabled avionics device of the plurality of CPDLC-enabled avionics devices is located in a different physical location within a cockpit of the aircraft;
    a CPDLC context manager coupled with each of the plurality of CPDLC-enabled avionics devices, wherein the CPDLC context manager grants two or more of the plurality of CPDLC-enabled avionics devices access to a CPDLC context memory and further directs a CPDLC message generated by two or more of the plurality of CPDLC-enabled avionics devices to a CPDLC message in/out buffer;
    a CPDLC activation key coupled with CPDLC context manager, wherein the CPDLC activation key, when selected, initiates a CPDLC mode in each of the plurality of CPDLC-enabled avionics devices;
    the shared CPDLC context memory coupled with the CPDLC context manager, wherein the CPDLC context manager manages the shared CPDLC context memory; and
    the CPDLC message in/out buffer coupled with the CPDLC context manager and a CPDLC communications unit coupled with the CPDLC message in/out buffer that sends and receives CPDLC messages to and from ground-based air traffic control,
    wherein the two or more of the plurality of CPDLC-enabled avionics devices cooperatively construct a single CPDLC message in the shared CPDLC context memory, wherein the CPDLC message comprises two components: 1) a requested speed, a requested altitude, or a requested heading, and 2) a navigational waypoint associated with component 1), wherein component 1) is indicated using a first one of two or more of the plurality of CPDLC-enabled avionics devices a)-c) and component 2) is indicated using a second one, different from the first one, of two or more of the plurality of CPDLC-enabled avionics devices a)-c), wherein cooperatively constructing comprises the first one of the two or more of the plurality of CPDLC-enabled avionics devices providing a first portion of the single CPDLC message corresponding to the requested speed, requested altitude, or requested heading, and the second one of the two or more of the plurality of CPDLC-enabled avionics devices providing a second portion of the single CPDLC message that is different from the first portion of the single CPDLC message and corresponding to the navigational waypoint associated with component 1).

2. The CPDLC system of claim 1, wherein one of the plurality of CPDLC-enabled avionics devices comprises the cockpit forward display device coupled to a graphics module and a graphics database with a display page of the cockpit forward display device implementing the CPDLC activation key.

3. The CPDLC system of claim 1, wherein one of the plurality of CPDLC-enabled avionics devices comprises the glareshield panel comprising one or more of a speed, heading, or altitude selection button and wherein the CPDLC activation key is implemented on the glareshield panel.

4. The CPDLC system of claim 1, wherein one of the plurality of CPDLC-enabled avionics devices comprises the radio panel comprising a radio frequency selection functionality.

5. The CPDLC system of claim 1, wherein one of the plurality of CPDLC-enabled avionics devices comprises the multifunction cockpit display unit (MCDU) comprising a display, a keypad, and a plurality of selection lines and wherein the CPDLC activation key is implemented on the MCDU.

6. The CPDLC system of claim 1 wherein the CPDLC context manager references a list or database of the CPDLC-enabled avionics devices.

7. A method for operating an integrated controller-pilot datalink communication (CPDLC) system in an aircraft comprising the steps of:

activating a CPDLC mode in each of a plurality of CPDLC-enabled avionics devices of the aircraft, wherein said plurality is selected from two or more of the following:
- a) a cockpit forward display device coupled to a graphics module and a graphics database,
- b) a glareshield panel comprising one or more of a speed, heading, or altitude selection button,
- c) a multifunction cockpit display unit (MCDU) comprising a display, a keypad, and a plurality of selection lines, wherein each CPDLC-enabled avionics device of the plurality of CPDLC-enabled avionics devices is located in a different physical location within a cockpit of the aircraft;

constructing a CPDLC message using two or more of the plurality of CPDLC-enabled avionics devices, wherein the CPDLC message comprises two components: 1) a requested speed, a requested altitude, or a requested heading, and 2) a navigational waypoint associated with component 1), wherein constructing the CPDLC message comprises indicating component 1) using a first one of two or more of the plurality of CPDLC-enabled avionics devices a)-c) and indicating component 2) using a second one, different from the first one, of two or more of the plurality of CPDLC-enabled avionics devices a)-c), wherein subsequent to indicating components 1) and 2), the two or more of the plurality of CPDLC-enabled avionics devices cooperatively construct a single CPDLC message in a shared CPDLC context memory, wherein cooperatively constructing comprises the first one of the two or more of the plurality of CPDLC-enabled avionics devices providing a first portion of the single CPDLC message corresponding to the requested speed, requested altitude, or requested heading, and the second one of the two or more of the plurality of CPDLC-enabled avionics devices providing a second portion of the single CPDLC message that is different from the first portion of the single CPDLC message and corresponding to the navigational waypoint associated with component 1);

communicating the single CPDLC message to a CPDLC communications unit using a CPDLC context manager; and at the CPDLC communications unit, transmitting the single CPDLC message to air traffic control.

8. The method of claim 7, wherein activating the CPDLC mode comprises pressing a CPDLC activation key implemented on one of the CPDLC-enabled avionics devices and further comprising indicating the CPDLC mode on each of the CPDLC-enabled avionics devices subsequent to or concurrent with activating the CPDLC mode.

9. The method of claim 7, further comprising storing the CPDLC message in a CPDLC message in/out buffer prior to communicating the CPDLC message to the CPDLC communications unit.

* * * * *